US008884742B2

(12) United States Patent
Gits et al.

(10) Patent No.: US 8,884,742 B2
(45) Date of Patent: Nov. 11, 2014

(54) IDENTIFYING LOCATIONS WITHIN A BUILDING USING A MOBILE DEVICE

(75) Inventors: Peter Michael Gits, Clarendon Hills, IL (US); Dale Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 12/925,966

(22) Filed: Nov. 3, 2010

(65) Prior Publication Data

US 2012/0105202 A1     May 3, 2012

(51) Int. Cl.
| | |
|---|---|
| G08B 5/22 | (2006.01) |
| H04W 4/00 | (2009.01) |
| G01S 5/00 | (2006.01) |
| G01C 21/20 | (2006.01) |
| G01S 5/02 | (2010.01) |

(52) U.S. Cl.
CPC ............. *G01S 5/0054* (2013.01); *G01C 21/206* (2013.01); *G01S 5/0205* (2013.01)
USPC ........................................... 340/8.1; 270/338

(58) Field of Classification Search
USPC ................. 340/8.1; 701/206; 455/456.1, 457; 370/388
See application file for complete search history.

(56) References Cited

U.S. PATENT DOCUMENTS

| | | | |
|---|---|---|---|
| 7,415,516 B1 | 8/2008 | Gits et al. | |
| 7,573,833 B2 | 8/2009 | Pirzada et al. | |
| 7,586,877 B2 | 9/2009 | Gits et al. | |
| 8,180,396 B2 * | 5/2012 | Athsani et al. | 455/557 |
| 8,259,692 B2 * | 9/2012 | Bajko | 370/338 |
| 8,265,652 B2 * | 9/2012 | Piersol et al. | 455/456.1 |
| 2005/0075116 A1 * | 4/2005 | Laird et al. | 455/456.3 |
| 2005/0114788 A1 * | 5/2005 | Fabritius | 715/767 |
| 2006/0256001 A1 * | 11/2006 | Markhovsky et al. | 342/146 |
| 2007/0069923 A1 * | 3/2007 | Mendelson | 340/988 |
| 2008/0252527 A1 * | 10/2008 | Garcia | 342/450 |
| 2009/0143972 A1 * | 6/2009 | Kitamura et al. | 701/200 |
| 2010/0008337 A1 * | 1/2010 | Bajko | 370/338 |
| 2010/0121567 A1 * | 5/2010 | Mendelson | 701/206 |
| 2012/0113138 A1 * | 5/2012 | Uusitalo et al. | 345/629 |

OTHER PUBLICATIONS http://miraveo.com/Solution.aspx.
http://www.navizon.com/navizonweb.html.

* cited by examiner

*Primary Examiner* — Benjamin C Lee
*Assistant Examiner* — Sigmund Tang
(74) *Attorney, Agent, or Firm* — Cindy Kaplan

(57) ABSTRACT

In one embodiment, a method includes displaying on a mobile device, a real time view of a user's environment within a building, communicating wirelessly in the building with a location tracking system operable to identify a location of the mobile device relative to one or more elements in the real time view, and displaying a computer generated overlay on the real time view, the overlay including location information associated with the elements.

20 Claims, 6 Drawing Sheets

IDENTIFYING LOCATIONS WITHIN A BUILDING USING A MOBILE DEVICE

TECHNICAL FIELD

The present disclosure relates generally to location services for mobile devices.

BACKGROUND

Mobile devices such as phones, personal digital assistants, and multimedia devices are commonly used. Many of these mobile devices include GPS (Global Positioning System) location services that are used to report the device's location through the use of online street maps. Location services provided by GPS are generally limited to outdoor use for identifying a location (e.g., street, building) relative to a map.

DESCRIPTION OF EXAMPLE EMBODIMENTS

Overview

Figure 1:
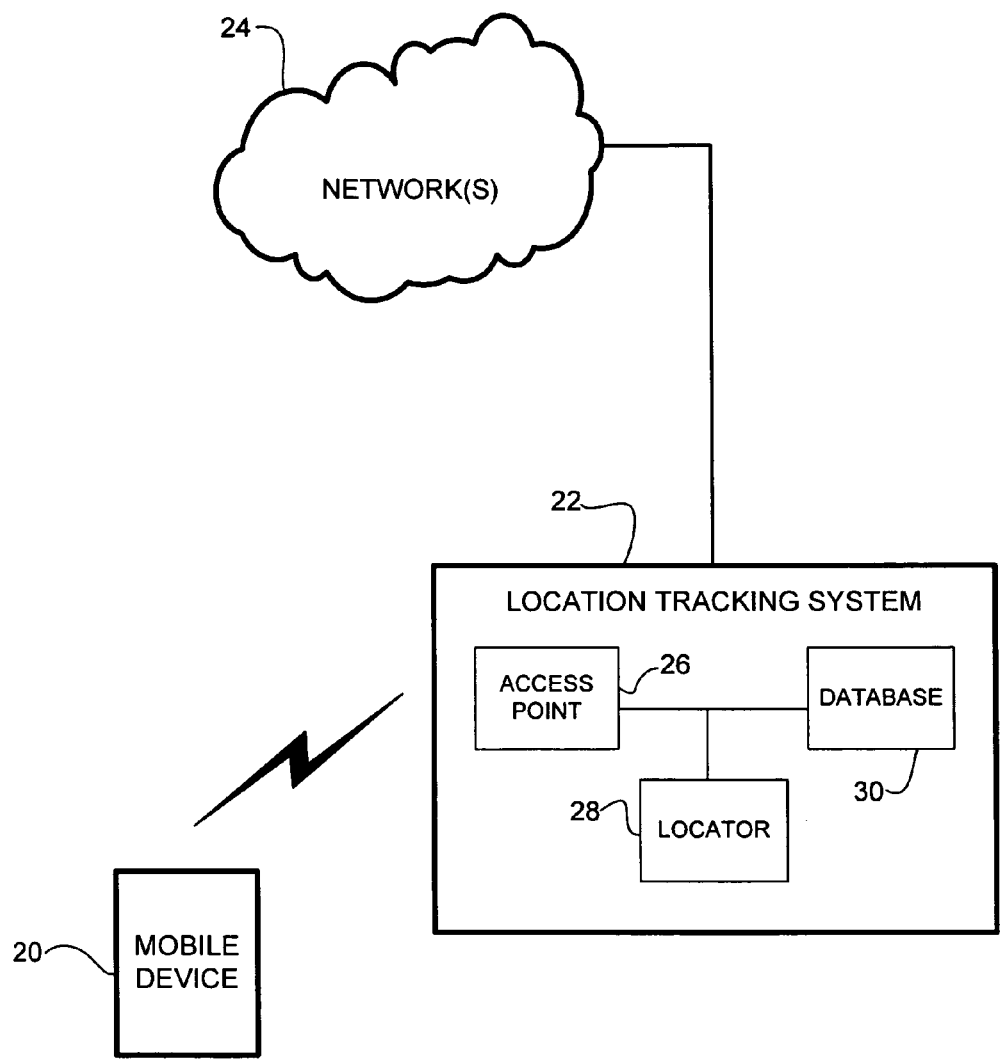
FIG. 1 illustrates an example of a mobile device in communication with a location tracking system.

In one embodiment, a method generally comprises displaying on a mobile device, a real time view of a user's environment within a building, communicating wirelessly in the building with a location tracking system operable to identify a location of the mobile device relative to one or more elements in the real time view, and displaying a computer generated overlay on the real time view, the overlay comprising location information associated with the elements.

In another embodiment, an apparatus generally comprises a location identifier for indicating a location of a mobile device relative to one or more elements in a building based on information received from a local location tracking system, memory for storing the location of the mobile device and location information for the elements, and a processor for generating a real time image and an overlay comprising the location information and transmitting the real time image and the overlay to a display on the mobile device.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications. Thus, the embodiments are not to be limited to those shown, but are to be accorded the widest scope consistent with the principles and features described herein. For purpose of clarity, details relating to technical material that is known in the technical fields related to the embodiments have not been described in detail.

Embodiments described herein allow users to obtain location information within a building using a mobile device. The term 'building' as used herein refers to any structure either fully or partially enclosing an area and includes, for example, an office or medical building, hotel, apartment building, arena, stadium, theater, parking garage, etc. The location information may include, for example, identification of the location of stationary elements such as rooms (e.g., conference rooms, hotel rooms), office cubes, designated spaces (e.g., desks in a shared space environment, or seats in a stadium or auditorium), mobile elements such as people associated with a mobile device, or elements which may be either stationary or mobile such as equipment (e.g., printer, server, medical equipment, cable, or circuit). Identification of the location may be provided as direction arrows, distances, or text, for example. The location information may also include details about the elements, as described below.

The mobile device may be any suitable equipment that supports wireless communication, including for example, a mobile phone, personal digital assistant, wireless enabled portable computing device, multimedia device, and the like.

It is to be understood that the elements, location information, applications, and mobile devices described herein are only examples and that the embodiments described herein may be used to provide other information for different applications, without departing from the scope of the embodiments.

As described in detail below, the mobile device includes a display screen and a camera, which allows a real time image of a user's environment to be viewed on the display. In one embodiment, the mobile device displays a live direct view of the environment augmented by virtual computer generated images (referred to as augmented reality). Location information (e.g., direction arrow, distance, note, person identifier, device information) associated with one or more elements in the real time image is displayed as a computer generated overlay on the real time view, as described further below.

Referring now to the drawings, and first to FIG. 1, a mobile device 20 is shown in wireless communication with a location tracking system 22 and one or more networks 24. Details of one example of the mobile device 20 are described below with respect to FIG. 3. The network 24 may include, for example, a local area network (LAN), wireless LAN (WLAN), wide area network (WAN), cellular network, Internet, intranet, satellite network, mobile data network, and the like, or any combination thereof. The mobile device 20 may communicate directly with the network 24 via a wireless connection or through the location tracking system 22. The mobile device 20 communicates with the location tracking system 22 through wireless transmissions, such as standard IEEE 802.11 protocol transmissions, or other wireless transmission protocols.

The location tracking system 22 is in communication with the network 24 through a wired or wireless connection. In one embodiment, the location tracking system 22 includes one or more access points 26, a locator 28, and a location database 30. The access points 26 may also be in communication with one or more wireless controllers, which may be configured for communication with a mobility services engine (e.g., Cisco Mobility Services Engine), for example. One or more components of the location tracking system 22 may be located remotely and in communication with the other components through the network 24. For example, the locator 28 may be in communication with a remote network device (e.g., server) containing the location database. Also, one or more components of the location tracking system 22 may be located on the mobile device 20. For example, portions of the database 30 may be stored on the mobile device 20 or the mobile device may perform operations associated with the locator 28.

The location tracking system 22 includes memory for storing location information (e.g., location database 30) and other information provided in the computer generated overlays, and one or more processors for executing locator applications along with other applications stored in memory. The system 22 may also include a timer for time stamping location data as it is received from wireless devices.

The locator 28 operates to track wireless devices within a wireless local area network infrastructure. The locations of the wireless devices may be identified using, for example, Wi-Fi technology, Bluetooth, UWB (Ultra-Wideband), or RFID (Radio Frequency Identification). In one embodiment, the locator 28 is configured to track any IEEE 802.11 standard based tag or device. The locator 28 may include, for example, a location appliance that operates in conjunction with the access points 26 and a wireless control system. A location appliance, such as Cisco Wireless Location Appliance, may be used to track the physical location of wireless devices to within a few meters. The position of the wireless device may be identified using coordinates (e.g., (x, y)) within a predefined space or relative position to a specified object.

The location tracking system 22 may track wireless devices such as the mobile device 20, devices associated with users (e.g., laptops, mobile devices), devices attached to equipment or located in rooms, or any other device configured for wireless communication. The location tracking system 22 may also record historical location information for one or more of the wireless devices.

The following are some examples of location tracking methods which may be used by the locator 28. It is to be understood that these are only examples, and that other methods may be used, without departing from the scope of the embodiments.

In one embodiment, the locator 28 uses RF (Radio Frequency) fingerprinting. RF prediction is used to create a grid mapped to a floor plan that includes physical characteristics and access points 26 in a given area. For finer accuracy, actual measurements and a calibration may be taken. With RF fingerprinting, real-work data regarding physical objects in a given area is gathered by access points and compared to the grid to determine the wireless device's location. With RF fingerprinting, the locator 28 uses the information that it receives from the access points 26 and matches it against a database of location fingerprints. The RF fingerprinting database preferably takes into account the building's floor plan as well as attenuation, reflection, and multiple paths.

The locator 28 may also use triangulation to identify the location of the wireless device. Triangulation uses multiple access points 26 to find the wireless device based on the received signal strength of the device at each access point. Using algorithms, the locator 28 determines the intersection point of the wireless device's signal at each access point 26 to identify the device's most likely location.

The locator 28 may also use a closest access point method to find wireless devices within the total coverage area of a single access point 26. However, this method only tracks devices to a general location area.

The location of the mobile device 20 or other wireless devices may be identified at regular predefined intervals or at the occurrence of an event (e.g., application activated, movement of the wireless device). In one embodiment, the location data may be sent to a server containing the location database 30, along with a timestamp corresponding to when the wireless device was at the location.

The location of rooms, equipment, etc., may be identified by a wireless device located in the room or on the equipment, or may be identified by other means and stored in the database 30. For example, a Wi-Fi enabled device may be located in the room to provide location information. In an enterprise environment, specified locations (e.g., conference rooms) may be mapped out within an office building or complex. Each conference room may be measured based on a reading between an access point and the edges of the conference room and mapped out and tagged with coordinates. This would eliminate the need for a wireless device to identify a fixed location. The stored measurements may also be updated or corrected, if required.

Figure 2:
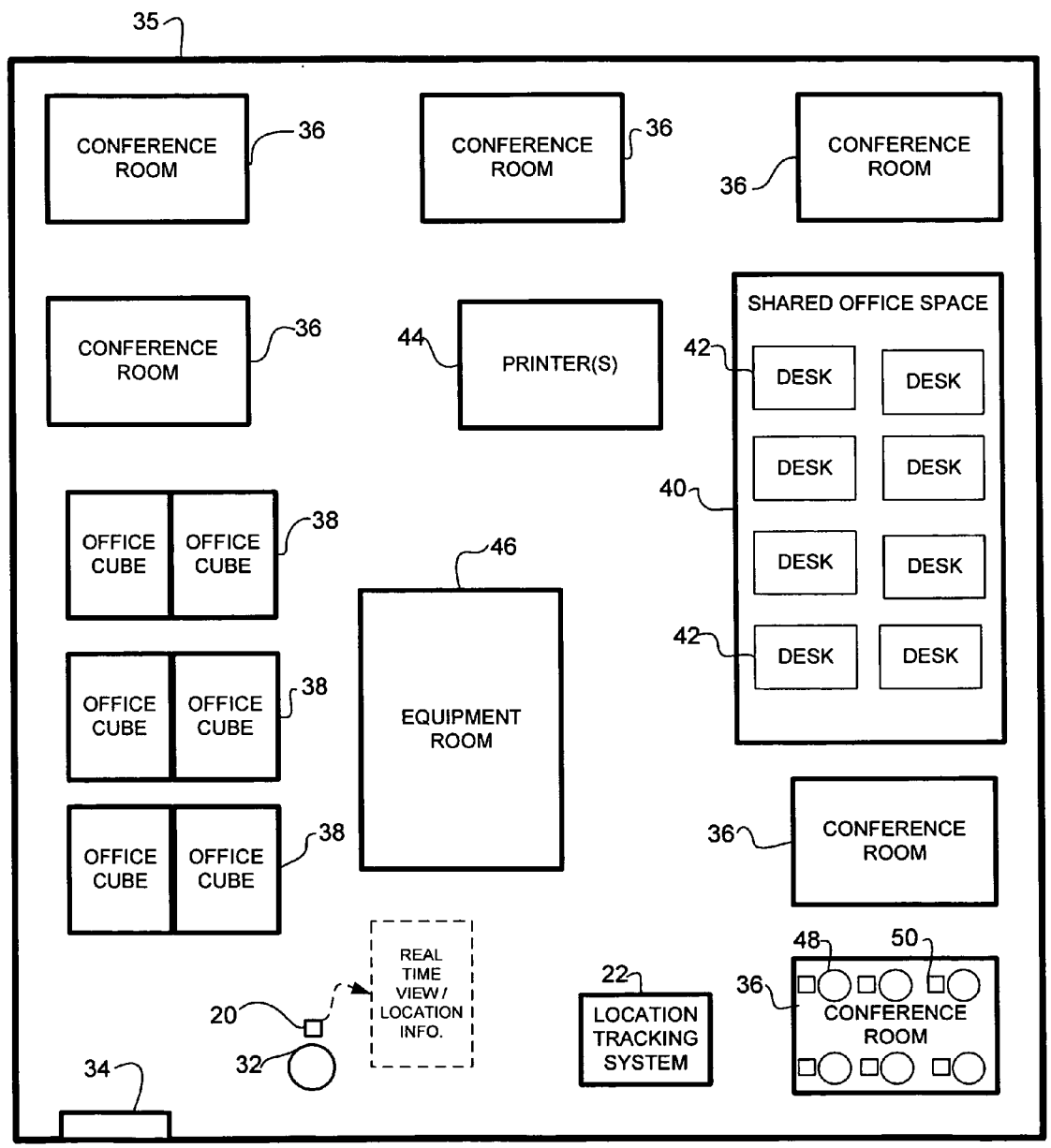
FIG. 2 illustrates an example of a floor plan of a building in which the mobile device of FIG. 1 can be used to locate elements.

FIG. 2 is a plan view illustrating an example of a floor plan in a building 35. A user 32 of the mobile device 20 has entered the floor (e.g., from an elevator, stairwell, or door 34). The floor plan in the example shown in FIG. 2 includes conference rooms 36, office cubes 38, a shared office space 40 (containing desks 42), printers 44 and an equipment room 46. The building 35 also includes the location tracking system 22, which may be centrally located or have components located throughout the floor or building. At least a portion of the location tracking system is located locally (e.g., access points 26 and locator 28 located within the building) so that the location tracking is performed in close proximity to the mobile device rather than through use of a remote locator such as a satellite for GPS. One or more components of the location tracking system may also be remotely located (e.g., database 30 stored at a remote server in a different building). After the user 32 activates the location tracking application on the mobile device 20, the user can view location information on the display screen of the mobile device. As described in detail below with respect to FIGS. 4 and 5, location information is displayed in a computer generated overlay on a real time view on the display screen of the mobile device 20.

The following describes examples of applications for which the mobile device 20 may be used to identify the locations of elements in the building 35. It is to be understood that these are only examples and that the mobile device 20 and location tracking system 22 may be configured to provide various other types of location information.

In one example, the user 32 has a meeting scheduled at one of the conference rooms 36. The user positions the mobile device 20 (as described in detail below) to show one or more of the conference rooms 36. Once the user reaches the conference room 36, he may use the mobile device 20 to identify people 48 that are already in the conference room. The people 48 are identified based on a wireless device 50 (e.g., mobile communication device, laptop) associated with each person. Other information, such as a list of conference participants that the people in the conference room are in communication with, may also be displayed.

A schedule for the conference room may also be provided in the graphical overlay. In one embodiment, the location service (or an upgraded form of the service) may further provide room availability and logistics (e.g., number of seats, equipment, etc.). The user of the mobile device 20 may sign up for an opening in the schedule by waving the mobile device at the door of the conference room, for example. Movement of the mobile device (e.g., pitching motion) or pressing a button on the device may trigger the reserving of the conference room. A desk 42 in a shared office space 40 may also be reserved and associated with a user.

The user 32 may also want to search for a specific person (associated with a wireless device). The person may be identified, for example, in a database mapping a MAC address of the user's device to a user's name. The location tracking system 22 preferably stores location information for all MAC addresses of users registered with the location service. If the user is at a meeting and the person is late, he may utilize the mobile device 20 to determine if the person is still in their office or in the building, for example. In one embodiment, the mobile device 20 can be used to indicate a time when the person was last at a specified location (e.g., office, building). The location information associated with a person's wireless device 50 may be stored so that when the user points his mobile device at a specified location (e.g., office 38) an overlay indicating the time that the person was last there is displayed on the real time view in the display screen. The overlay may also show a trail or arrows indicating the direction the person travelled when he left his office. Location information from a historical sampling that timestamps the person's location information as he moved away from his office is used to generate the overlay.

Additional information, such as the person's schedule or administrator, or percentage of time they are late to a meeting, may also be displayed in the overlay. In one embodiment, the person may leave a note for all visitors or specific visitors. The note is displayed as an overlay on the real time image when the user holds the mobile device 20 near the person's office or desk. The user of the mobile device 20 may also post a message for the person he is looking for (e.g., I was here at 2:00 pm and will be back at 2:30 pm, or call me at xxx-xxxx). When the person returns to his office he can hold up his wireless device to check for messages. The new message is displayed as an overlay on the real time image. The message may be viewed as an overlay on the image of the wall, door, computer, or any other specified location. The message may be posted using a keyboard on the mobile device or by writing a message using the mobile device as a pencil or paint brush, for example. The compass or other position sensor in the mobile device 20 tracks the device's movement (e.g., yaw, angle) so that the user can write or draw a message through movement of the mobile device. The user may also apply security settings to the note so that only the intended recipient can view the message.

In one embodiment, the mobile device 20 may be used within the conference room 36, office 38, or equipment room 46 to identify different wires connected to network devices. For example, the mobile device 20 may be held up to a network device, computer, or office and a schematic may be displayed in the overlay to indicate the circuit or network to which the device or office is connected. This may also be used to track a port or circuit. Technical or repair information (e.g., operating instructions, technical manual) may also be displayed when the mobile device is held up to specific equipment.

The mobile device 20 may also be used to obtain real time information about an element viewed in the display. For example, if the user 20 is positioned at or near the printer 44, information about the printing queue may be displayed as an overlay (e.g., list of printing queues, number of pages for each item in queue, owner of each item in the printing queue, time until item in queue will be printed).

In one embodiment, the mobile device 20 may be used to track one or more items within a building. For example, in hospitals, the mobile device may be used to locate an emergency cart by holding the device up in a hallway. The mobile device may also be used to locate a book in a library or book store. For example, locations of books may be stored in the database 30 and provided to the mobile device 20 for display as direction arrows pointing to the location of a specific book. Other applications include locating inventory within a warehouse or a car in a rental car parking lot.

Security policies may be applied to the location information to limit access to information to specified users. Different information may be displayed on the overlay based on a policy associated with the user. For example, a policy may specify one type of access for employees and another type of access for visitors that obtain guest privileges. Also, different types of employees may be allowed different levels of access to location information. Access may also be allowed or denied based on a location of the user.

Figure 3:
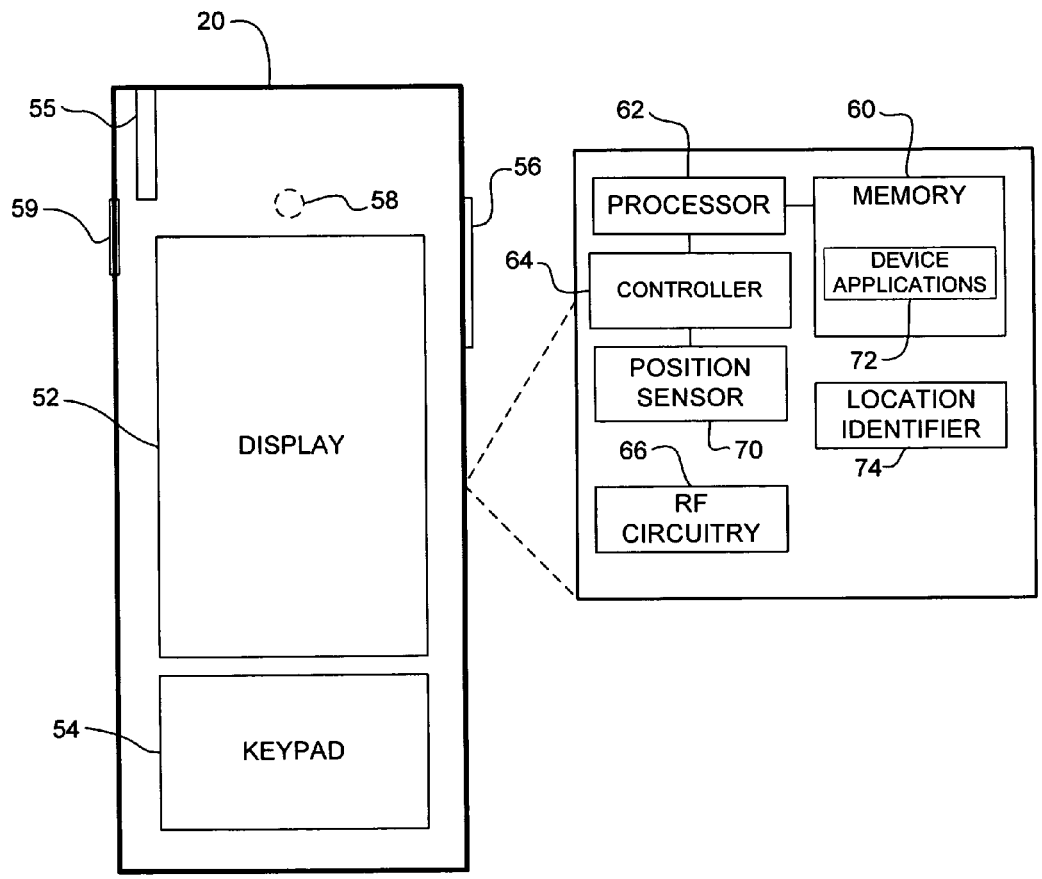
FIG. 3 illustrates an example of the mobile device of FIG. 1 that may be used to implement embodiments described herein.

FIG. 3 illustrates an example of a mobile device 20 in which embodiments described herein may be implemented. The mobile device 20 includes a visual display 52 and a keypad 54 comprising multiple keys (not shown) used in operation of the device. The keypad 54 may also be a touch screen, which may be integrated with the display 52. The keypad 54 may include numeric keys, alphabetic keys, standard telephone keys, or any other icons or symbols. The keypad 54 may be used to type in a specific element (e.g., room, equipment, person) within the building to locate or type a message for display in the overlay. The mobile device 20 may include any number of other user interfaces such as one or more manual buttons (e.g., switch 56), a mouse, or other user interface. The user can select and activate the location application by touching the screen or pressing one or more buttons, for example. The mobile device 20 also includes an antenna 55, which may be internal or external to the device, for wireless communications. One or more external ports 59 may be provided for connection with another input or output device. The device 20 may also include one or more speakers and one or more microphones (not shown).

The mobile device 20 has an optical sensor (e.g., built-in camera) 58 on one or more faces of the device. The optical sensor 58 may be a charge-coupled device, complementary metal-oxide semiconductor (CMOS), or any other suitable device. The optical sensor 58 receives light projected through one or more lenses and converts the light to data representing an image. The optical sensor 58 is used to generate the real time view that is displayed on the display screen 52.

As illustrated in the block diagram of FIG. 3, the mobile device 20 further includes memory 60, one more processors 62, controller 64, RF (Radio Frequency) circuitry 66, position sensor 70, and a location identifier 74.

Memory 60, which may include one or more computer readable storage mediums, may be any form of volatile or nonvolatile memory, including for example random access memory (RAM), read-only memory (ROM), magnetic media, optical media, flash memory, removable media, or any other suitable memory component. Memory 60 may store any data or information, including software and encoded logic, utilized by the mobile device 20. Memory 60 also includes software components such as device applications 72 and an operating system.

The one or more processors 62 run or execute various code, software programs, or instructions stored in memory 60 to perform various functions for the device 20 and to process data. Logic may be encoded in one or more tangible media for execution by the processor 62. For example, memory 60 can be utilized to store and retrieve software programs incorporating computer code that implements aspects of the invention, data for use with the invention, and the like. The mobile device 20 includes any suitable combination of hardware, software, or encoded logic operable to send, receive, and process data or signals.

The RF circuitry 66 receives and transmits RF signals and converts electrical signals to/from electromagnetic signals and communicates with communication devices via the electromagnetic signals. Communication circuitry allows the mobile device to communicate with the location tracking system 22 or other network devices using any suitable communications protocol. For example, communications circuitry may support Wi-Fi (e.g., IEEE 802.11 protocol) or any other communication protocol.

The controller 64 provides for management and control of various elements within the device 20. For example, the controller 64 may access information maintained within memory 60 and control other elements to interact with users and other communication devices.

The position sensor 70 detects the position or relative position of the mobile device 20. In one embodiment, the position sensor 70 enables detection of different manual manipulation, including, for example, orientation, motion, tilt, etc. The position sensor 70 may include, for example, a motion detector, accelerometer, gravity meter, gyroscope, proximity sensor, optical sensor, magnetometer, compass, RFID, wireless sensor, or any other device configured to determine the position of the mobile device 20. In one embodiment, the position sensor 70 determines the orientation of the device (e.g., horizontal, vertical) based on analysis of data received from one or more accelerometers. The accelerometer may detect movement of the mobile device 20 along any axis (e.g., horizontal, vertical) or any combination of planes (e.g., three dimensional movement). The controller 64 may include a delay so that the mobile device has to remain in its position for a specified amount of time before the operating mode of the device is switched (e.g., between horizontal and vertical modes), to prevent inadvertent toggling between operating modes.

The location identifier 74 may be used in combination with one or more components of the location tracking system 22 to identify the location of the mobile device 20 within a building or may store information received from the location tracking system indicating the location of the mobile device.

It is to be understood that the device 20 shown in FIG. 3 and described herein is only one example of a mobile device, and that the device may have additional, fewer or different components or a different arrangement or configuration of components, without departing from the scope of the embodiments.

Figure 4:
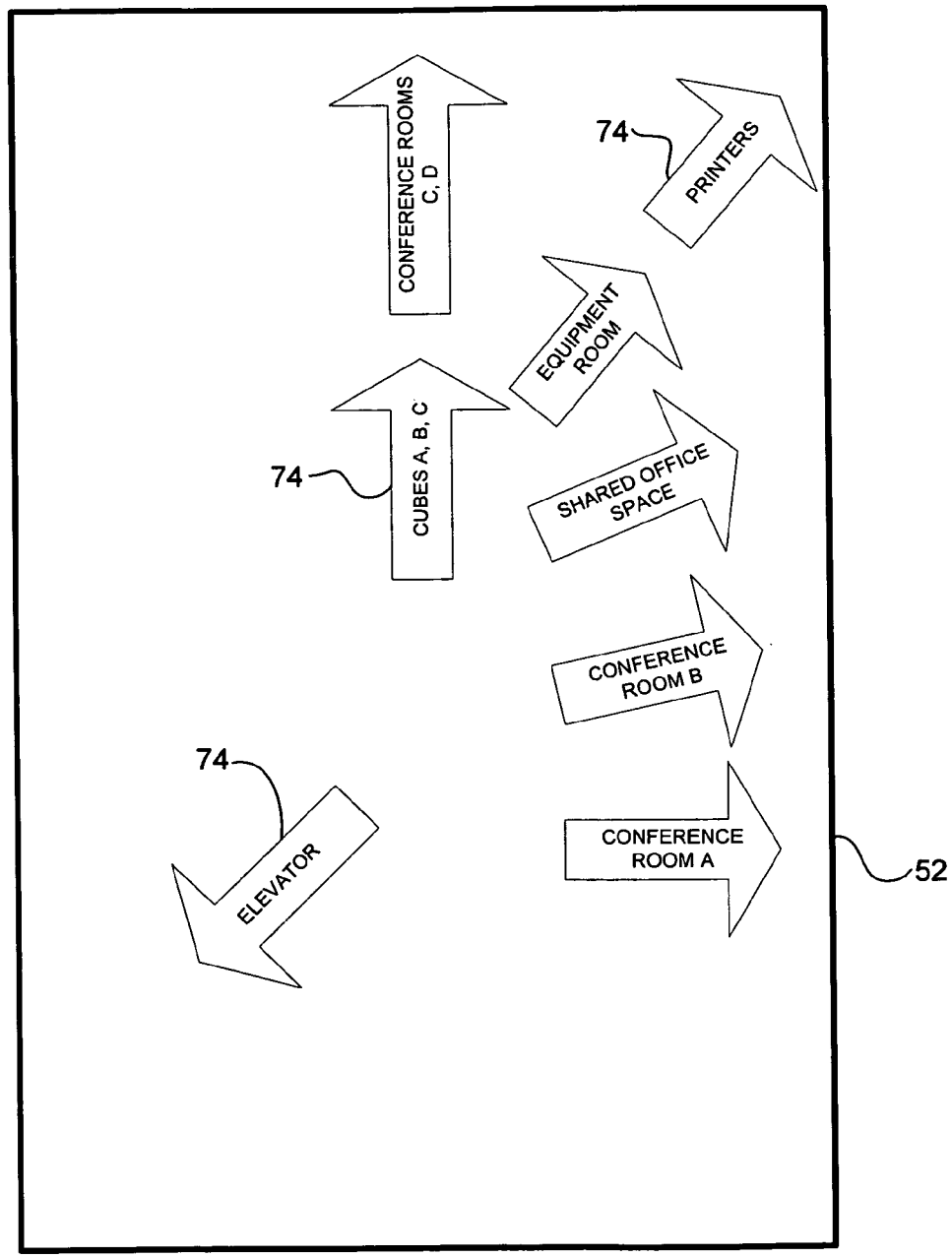
FIG. 4 illustrates an example of a display screen of the mobile device of FIG. 1 displaying direction arrows.
Figure 5:
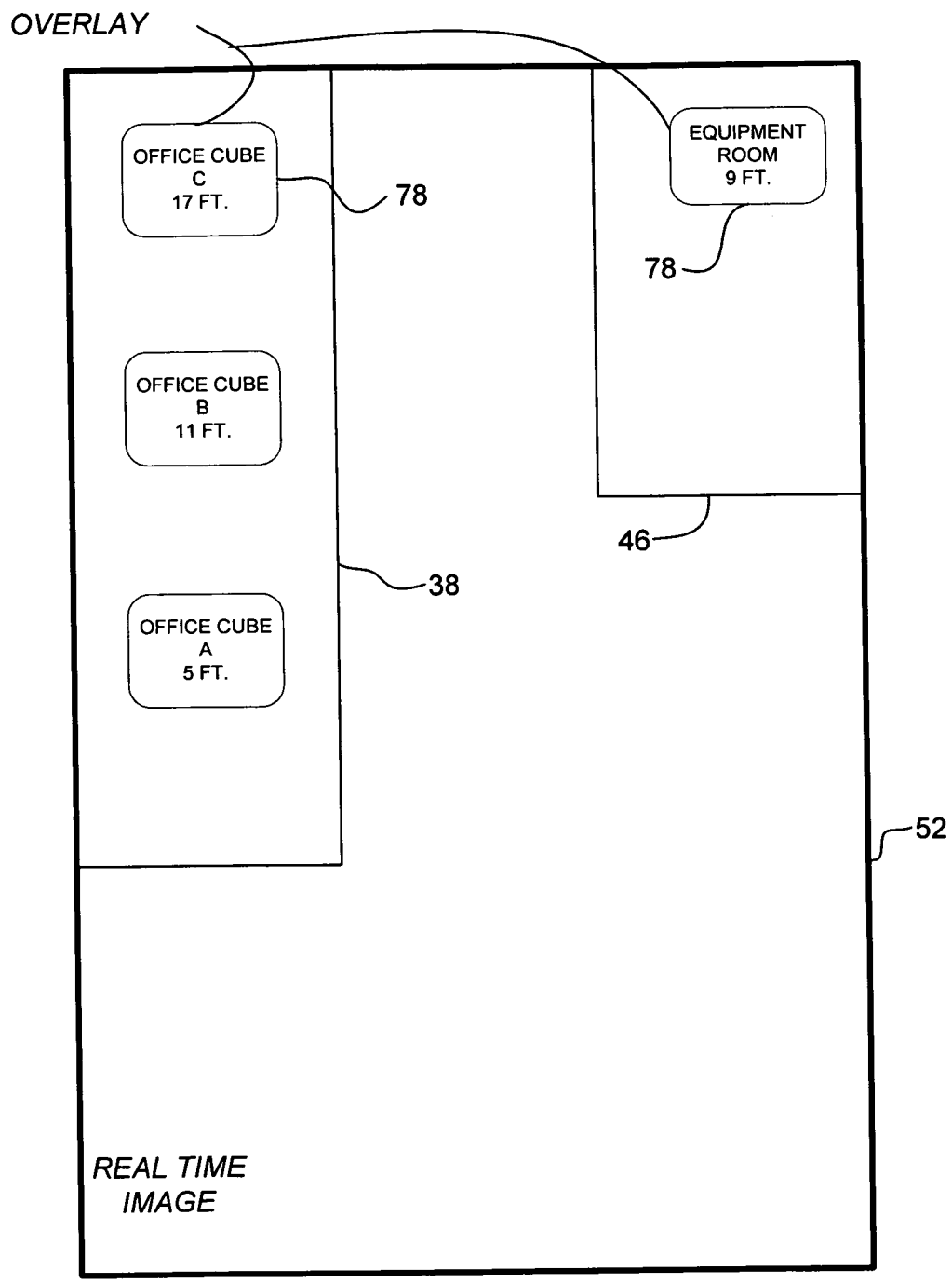
FIG. 5 illustrates an example of the display screen of the mobile device of FIG. 1 displaying information overlaid on a real time image.

In one embodiment, the mobile device 20 is configured to operate in different modes based on the position of the device. When the mobile device 20 is held in a generally flat, horizontal position, directions to elements are displayed with arrows (FIG. 4). If the mobile device 20 is tilted upwards (towards a generally vertical position), the elements are displayed in the real time view with overlays displaying location information (e.g., element identifier and a general distance as to how far away the element is in relation to the mobile device's location) (FIG. 5). If the mobile device is tilted further up, additional overlays appear identifying elements that are farther away.

FIG. 4 illustrates an example of the display screen 52 when the mobile device 20 is held in a generally horizontal position (front or back face of the mobile device generally parallel to the floor). Arrows 74 indicate the direction of some of the elements in the floor layout of FIG. 2. The arrows 74 may also include information, such as approximate distance to each element.

FIG. 5 is a schematic illustrating an example of a display 52 with the mobile device 20 in a generally vertical position (front or back face of the mobile device generally parallel to walls of the building). The display 52 shows the real time image as viewed through the camera of the mobile device 20. Location information is used to position the overlays 78 over the real image (e.g., on or near the elements associated with the overlay). In one embodiment, the overlays 78 identify elements viewed in the real time image on the display 52 and provide an approximate distance between the mobile device 20 and the element. In the example shown in FIG. 5, the user of the mobile device 20 is positioned with office cubes 38 (identified in the overlays as office cube A, office cube B, and office cube C) in front of the device and the equipment room 46 to the right (FIG. 2). The overlays may provide location information for elements in the real time image (e.g., viewed directly or hidden behind one or more other elements) or elements near the mobile device. One or more of the overlays may be highlighted to identify an element that a user has chosen to locate (e.g., specific conference room or person the user is searching for).

As the user walks towards a location, the distances may be updated. Updated position information may be provided at a set interval (e.g., each time a timer expires) or based on movement of the mobile device. The information displayed on the overlay image may be stored locally on the mobile device, on a local server, or a remote server connected to a network, or any combination thereof. As previously discussed, various information may be displayed in the overlays 78.

Figure 6:
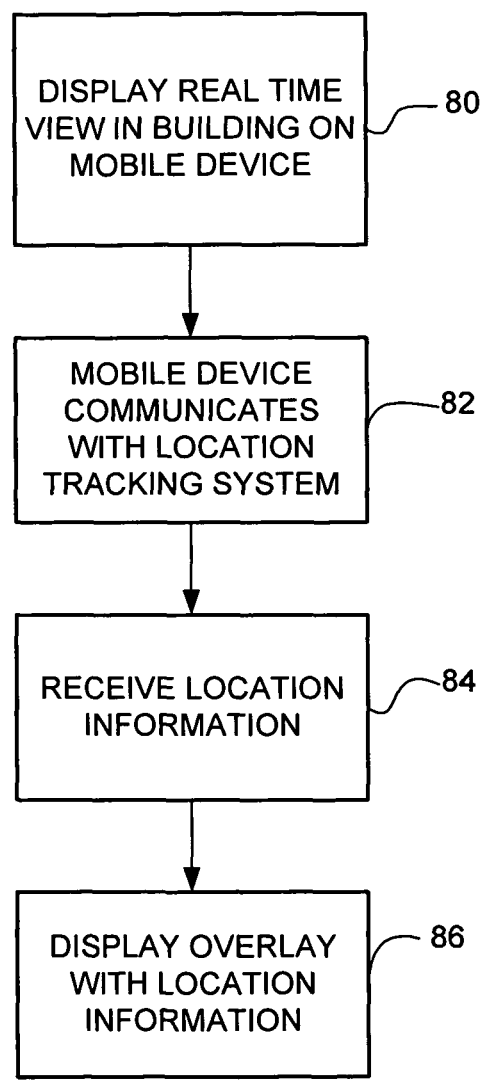
FIG. 6 is a flowchart illustrating an overview of a process for receiving location information with the mobile device of FIG. 1, in accordance with one embodiment.

FIG. 6 is a flowchart illustrating an overview of a process for identifying locations within a building using a mobile device, in accordance with one embodiment. At step 80, a real time view of a user's environment within a building is displayed on the mobile device 20. Once the location identifying system is activated on the mobile device 20 and wireless communication is established with the location tracking system 22, the mobile device communicates wirelessly with the location tracking system (step 82). The location of the mobile device 20 relative to one or more elements within the real time view is identified by the location tracking system 22 and provided to the mobile device along with other location information (step 84). The mobile device 20 displays a computer generated overlay with location information on the real time view (step 86). The overlay comprises location information associated with the elements in the real time view. Location information may also be displayed for elements that are near the mobile device 20 but not currently in the real time view. The location information is preferably updated as the mobile device moves towards or away from the elements.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method comprising:
    displaying on a mobile device, a real time view of a user's environment within a building;
    communicating wirelessly in the building with a location tracking system operable to identify a location of the mobile device relative to one or more elements in said real time view; and
    displaying a computer generated overlay on said real time view, said overlay comprising location information associated with said one or more elements;
    wherein responsible to the mobile device being rotated from a generally vertical position to a generally horizontal position, said computer generated overlay changes from said location information to a graphical image providing directions to said one or more elements.

2. The method of claim 1 wherein the location tracking system comprises at least one access point.

3. The method of claim 1 wherein the location of the mobile device is identified using Wi-Fi technology.

4. The method of claim 1 wherein the location of said one or more elements is stored in a network device.

5. The method of claim 1 wherein said one or more elements comprises conference rooms.

6. The method of claim 5 wherein said location information comprises identification of people within one of the conference rooms.

7. The method of claim 1 wherein said one or more elements comprises equipment and said location information comprises information associated with the equipment.

8. An apparatus comprising:
a location identifier for indicating a location of a mobile device relative to one or more elements in a building based on information received from a local location tracking system;
memory for storing the location of the mobile device and location information for said one or more elements;
a processor for generating a real time image and an overlay comprising said location information and transmitting said real time image and said overlay to a display on the mobile device; and
a position sensor operable to sense rotation of the mobile device from a generally vertical position to a generally horizontal position;
wherein responsive to the mobile device being rotated from said generally vertical position to said generally horizontal position, said processor is operable to change said overlay from said location information to a graphical image providing directions to said one or more elements.

9. The apparatus of claim 8 wherein the location identifier is configured to receive location information obtained utilizing Wi-Fi technology.

10. The apparatus of claim 8 wherein said one or more elements comprises conference rooms.

11. The apparatus of claim 10 wherein said location information comprises identification of people within one of the conference rooms.

12. The apparatus of claim 8 wherein said one or more elements comprises equipment and said location information comprises information associated with the equipment.

13. The apparatus of claim 8 wherein the location tracking system comprises one or more access points.

14. Logic encoded on one or more non-transitory media for execution and when executed operable to:
display on a mobile device, a real time view of a user's environment within a building;
communicate wirelessly in the building with a location tracking system operable to identify a location of the mobile device relative to one or more elements in said real time view; and
display a computer generated overlay on said real time view, said overlay comprising location information associated with said one or more elements,
wherein the logic is further operable to change the computer generated overlay from said location information to a graphical image providing directions to said one or more elements when the mobile device is rotated from a generally vertical position to a general horizontal position.

15. The logic of claim 14 wherein the location tracking system comprises at least one access point.

16. The logic of claim 14 wherein said one or more elements comprises conference rooms.

17. The logic of claim 14 wherein the location information comprises a distance between the mobile device and said one or more elements, said distance identified utilizing Wi-Fi technology.

18. The logic of claim 14 wherein the location of the mobile device is identified using Wi-Fi technology.

19. The logic of claim 16 wherein said location information comprises identification of people within one of the conference rooms.

20. The logic of claim 14 wherein said one or more elements comprise equipment and said location information comprises information associated with the equipment.

* * * * *

UNITED STATES PATENT AND TRADEMARK OFFICE
CERTIFICATE OF CORRECTION

| | | |
|---|---|---|
| PATENT NO. | : 8,884,742 B2 | Page 1 of 1 |
| APPLICATION NO. | : 12/925966 | |
| DATED | : November 11, 2014 | |
| INVENTOR(S) | : Peter Michael Gits et al. | |

It is certified that error appears in the above-identified patent and that said Letters Patent is hereby corrected as shown below:

In the Claims

Col. 8, line 65 should read as follows:

Claim 1. A method comprising:
displaying on a mobile device, a real time view of a user's environment within a building;
communicating wirelessly in the building with a location tracking system operable to identify a location of the mobile device relative to one or more elements in said real time view; and
displaying a computer generated overlay on said real time view, said overlay comprising location information associated with said one or more elements;
wherein responsive to the mobile device being rotated from a generally vertical position to a generally horizontal position, said computer generated overlay changes from said location information to a graphical image providing directions to said one or more elements.

Signed and Sealed this
Twenty-fourth Day of February, 2015

Michelle K. Lee
*Deputy Director of the United States Patent and Trademark Office*